United States Patent
Kroes

(10) Patent No.: US 12,428,151 B2
(45) Date of Patent: Sep. 30, 2025

(54) DUAL LATCH SYSTEM FOR HOPPER COVER OF AN AERIAL APPLICATION AIRCRAFT

(71) Applicant: Texas Transland LLC, Wichita Falls, TX (US)

(72) Inventor: Calvin L. Kroes, Loveland, OK (US)

(73) Assignee: Texas Transland LLC, Wichita Falls, TX (US)

( * ) Notice: Subject to any disclaimer, the term of this patent is extended or adjusted under 35 U.S.C. 154(b) by 0 days.

(21) Appl. No.: 18/965,893

(22) Filed: Dec. 2, 2024

(65) Prior Publication Data

US 2025/0178730 A1 Jun. 5, 2025

Related U.S. Application Data

(60) Provisional application No. 63/604,628, filed on Nov. 30, 2023.

(51) Int. Cl.

| | | |
|---|---|---|
| *B64D 1/16* | (2006.01) | |
| *E05B 77/22* | (2014.01) | |
| *E05B 81/04* | (2014.01) | |
| *E05B 81/16* | (2014.01) | |
| *E05B 83/00* | (2014.01) | |

(52) U.S. Cl.
CPC ............ *B64D 1/16* (2013.01); *E05B 77/22* (2013.01); *E05B 81/04* (2013.01); *E05B 81/16* (2013.01); *E05B 83/00* (2013.01)

(58) Field of Classification Search
CPC . B64D 1/16; E05B 77/22; E05B 81/04; E05B 81/16; E05B 83/00
USPC .................................................. 244/76 R
See application file for complete search history.

(56) References Cited

U.S. PATENT DOCUMENTS 9,266,612 B2 * 2/2016 Thompson ............... B64D 1/16

FOREIGN PATENT DOCUMENTS

| CN | 215842537 | * | 2/2022 | |
| EP | 1129939 | * | 9/2001 | ............ B64C 25/16 |

OTHER PUBLICATIONS

ReabeAir.com; Reabe Hopper Packer, "Innovative and Reliable Products Designed with the Pilot and Mechanic in Mind", copyright 2010-2024 Raebe Design LLC, 2 pages.
Wingman, Inc., Flight Manual Supplement for Air Tractor AT-801 Aircraft with 'Wingman System', Report No. W802-06, dated Sep. 20, 2000, 33 pages.

* cited by examiner

*Primary Examiner* — Jerome Grant, II
(74) *Attorney, Agent, or Firm* — Baker Botts L.L.P.

(57) ABSTRACT

In one embodiment, a system for an aerial application aircraft includes a hopper cover, an electric actuator coupled to the hopper cover, a latch sequencing mechanism, a spring, and a dual latch mechanism. The latch sequencing mechanism includes a latch rod coupled to the electric actuator that moves the latch rod between a latched position and an unlatched position. The spring is coupled to the latch sequencing mechanism and the latch rod, and the spring exerts linear mechanical force based on the latch rod being in the latched or unlatched position. The dual latch mechanism is coupled to the latch rod and includes a first latch pin that engages a first latch box and a second latch pin that engages a second latch box opposite the first latch box.

20 Claims, 13 Drawing Sheets

DUAL LATCH SYSTEM FOR HOPPER COVER OF AN AERIAL APPLICATION AIRCRAFT

CROSS REFERENCE TO RELATED APPLICATIONS

This application claims priority to U.S. provisional patent application Ser. No. 63/604,628 entitled "SYSTEMS AND METHODS FOR REPLENISHING AN AERIAL APPLICATION AIRCRAFT," filed on Nov. 30, 2023.

TECHNICAL FIELD

The various aspects and embodiments described herein relate to systems and processes involved in aerial application of a dry granular material, dry powder material, dry seed, and moistened sprouted seed. More specifically, the various aspects and embodiments in the present disclosure related to automated systems and processes for closing and sealing a hopper cover of an aerial application aircraft.

BACKGROUND

Aircrafts are often used to spread material over a surface in a technique referred to as "aerial application." For example, aerial application of materials is commonly used in agricultural, firefighting, forest seeding, and other applications. Aerial application systems may be used to disperse dry material, such as seeds or fertilizer, or wet material, such as water or crop protection products. One type of system that is conventionally used in aircrafts performing aerial application ("aerial application aircrafts") of a dry granular material, dry powder material, dry seed, moistened sprouted seed, and other materials ("application materials") is known as a "hopper." A hopper is a container, which is typically located between the cockpit and nose of the aerial application aircraft, that receives and holds the application materials. At the bottom of a hopper, a dump gate is used to control the release of the application materials. At the top of a hopper, there is an opening used for receiving application materials from an external source and a hopper cover used to cover the hopper opening when application materials are not being loaded into the hopper. The hopper cover is typically secured by a single latch pin engaging a single latch box in the middle of one side of the hopper cover. With existing systems, loading the hopper can result in certain inefficiencies. Additionally, the application materials may not be completely secured by existing hopper covers.

BRIEF DESCRIPTION OF THE DRAWINGS

These and other features and advantages of the various embodiments disclosed herein will be better understood with respect to the following description and drawings, in which like numbers refer to like parts throughout, and in which.

DESCRIPTION OF EXAMPLE EMBODIMENTS

Overview

Figure 1:
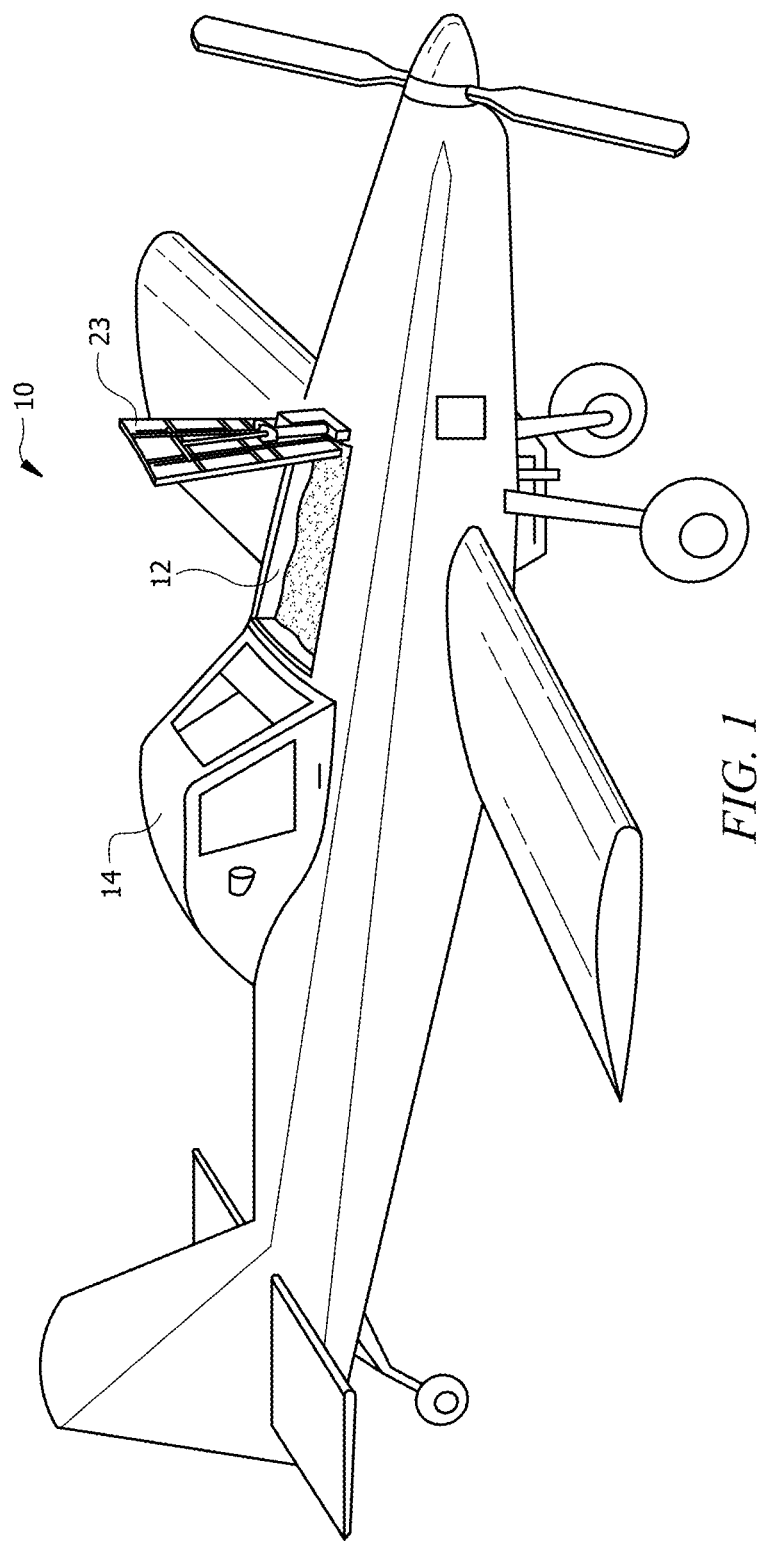
FIG. 1 illustrates an aerial application aircraft, in accordance with certain embodiments.

During busy seasons, pilots of aerial application aircrafts may land and take-off dozens of times, fly for many hours, and cover thousands of acres of land with application materials in a single day. The amount of acres for which application materials may be applied by an aerial application aircraft in a single trip depends on a variety of factors, including but not limited to the type of application material to be applied, type of spreader, temperature, humidity, application airspeed, output rate, swath width (distance covered on the ground by the application materials), and effective capacity of the hopper (capacity of hopper actually able to be utilized). The amount of acres for which application materials may be applied by an aerial application aircraft in a single day depends on the factors listed above for a single trip, as well as the time it takes to land the aerial application aircraft, replenish the hopper of the aerial application aircraft with application materials, and take-off again for the next trip (the "replenishing process").

Aerial application aircrafts must be periodically replenished. The current process for replenishing an aerial application aircraft typically involves the following: (i) getting out of the aerial application aircraft to open the hopper cover, (ii) pouring or loading application materials into the hopper via a means compatible with the hopper opening and cover, (iii) pausing the pouring or loading of application materials to periodically level the application materials poured or loaded into the hopper, (iv) resuming pouring or loading application materials into the hopper via a means compatible with the hopper opening and cover until the desired amount of application materials has been added to the hopper, (v) manually closing the hopper cover, and (vi) getting back into the aerial application aircraft to take-off for another trip. Furthermore, current hopper covers are typically secured by a single latch pin engaging a single latch box in the middle of one side of the hopper cover. Current replenishing systems and processes are inefficient and prone to complications. Embodiments of the present disclosure address problems with current replenishing systems and processes.

According to an embodiment, a system for an aerial application aircraft includes a hopper cover, an electric actuator coupled to the hopper cover, a latch sequencing mechanism, a spring, and a dual latch mechanism. The latch sequencing mechanism includes a latch rod coupled to the electric actuator that moves the latch rod between a latched position and an unlatched position. The spring is coupled to the latch sequencing mechanism and the latch rod, and the spring exerts linear mechanical force based on the latch rod being in the latched or unlatched position. The dual latch mechanism is coupled to the latch rod and includes a first latch pin that engages a first latch box and a second latch pin that engages a second latch box opposite the first latch box.

According to an embodiment, a method for controlling a hopper cover of an aerial application aircraft includes engaging an advanced control system when the hopper cover is to be controlled. The advanced control system engages an electric actuator coupled to a latch sequencing mechanism and moves a latch rod between a latched position and an unlatched position. Based on the latch rod being in an unlatched or latched position, compressing a spring coupled to the latch sequencing mechanism. Further engaging a dual latch mechanism coupled to the latch rod, causing a first latch pin to engage a first latch box and a second latch pin to engage a second latch box opposite the first latch box.

In accordance with certain embodiment, the spring is compressed when the latch rod is in the latched position and decompressed when the latch rod is in the unlatched position. In accordance with certain embodiments, the hopper cover is open when the latch rod is in the unlatched position and the hopper cover is closed when the latch rod is in the latched position. In accordance with certain embodiments, the first latch pin engages the first latch box and the second latch pin engages the second latch box when the latch rod is placed in the latched position.

In accordance with certain embodiment, the advanced control system the advanced control system includes a safety indicator that indicates when the safety indicator exceeds a predefined threshold. In accordance with certain embodiments, the advanced control system automatically controls a flow of electrical current based upon indication of an electrical surge exceeding a predefined threshold.

Technical advantages of certain embodiments of this disclosure may include one or more of the following. This disclosure describes systems and methods for an aerial application aircraft related to automated systems and processes for closing and sealing a hopper cover of an aerial application aircraft. Certain embodiments allow a hopper cover to automatically engage two latches opposite each other, which facilitates sealing the hopper cover and keeping application materials in the hopper of the aerial application aircraft, thus preventing waste and inefficiency. In some embodiments, a spring is coupled to the latch sequencing mechanism, which allows mechanical closing force to be constantly applied in the absence of electric or hydraulic action and prevents waste of application materials. In some embodiments, the dual latch mechanism includes a first and second latch pin that engage inclined latch boxes, which applies addition closing force against the hopper cover under varying conditions, thus allowing the hopper cover to maintain and improve its seal when closed under a wide range of operating conditions.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Embodiments of the present disclosure and its advantages are best understood by referring to FIGS. 1 through 12 of the drawings, with like numerals being used for like and corresponding parts of the various drawings. FIG. 1 illustrates aerial application aircraft 10. Aerial application aircraft 10 includes hopper 12, which contains or holds the application materials poured or loaded into hopper 12 of aerial application aircraft 10, hopper cover 23, and cockpit 14, which is where a pilot of aerial application aircraft 10 operates the aircraft and related systems. Hopper 12 represents any suitable compartment to hold application materials. While hopper 12 is positioned near the top of aircraft 10, it is contemplated that hopper 12 may be positioned in any suitable place on aircraft 10 that facilitates the dispersion of application materials. Hopper 12 will be described in greater detail in FIGS. 2 and 12. Hopper cover 23 will be described in greater detail in FIGS. 2, 4, 8, 9A, 9B, 9C, and 10. The pilot of aerial application aircraft 10 is able to monitor and control the systems described herein and below from cockpit 14.

Figure 2:
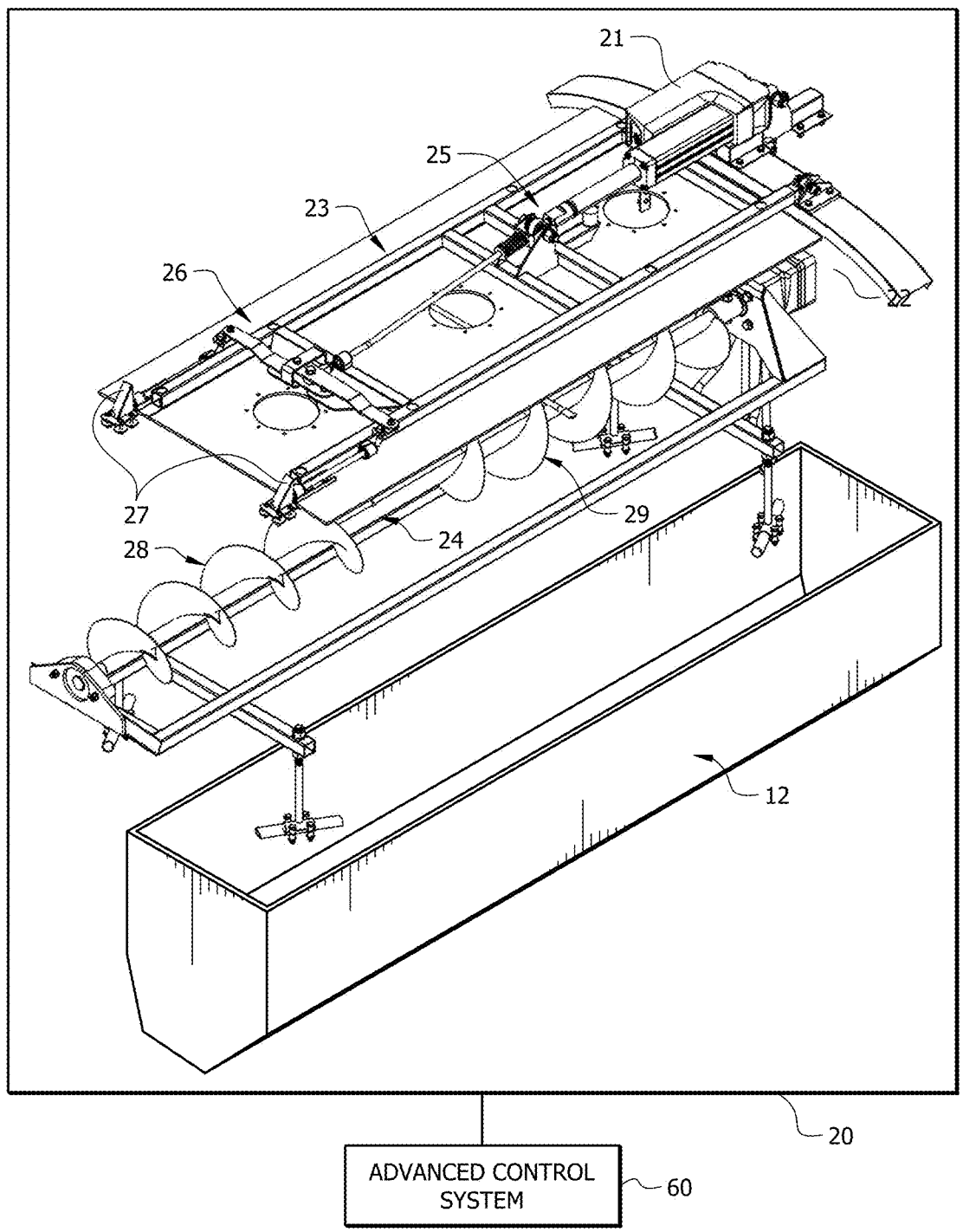
FIG. 2 illustrates a hopper system, in accordance with certain embodiments.
Figure 3A:
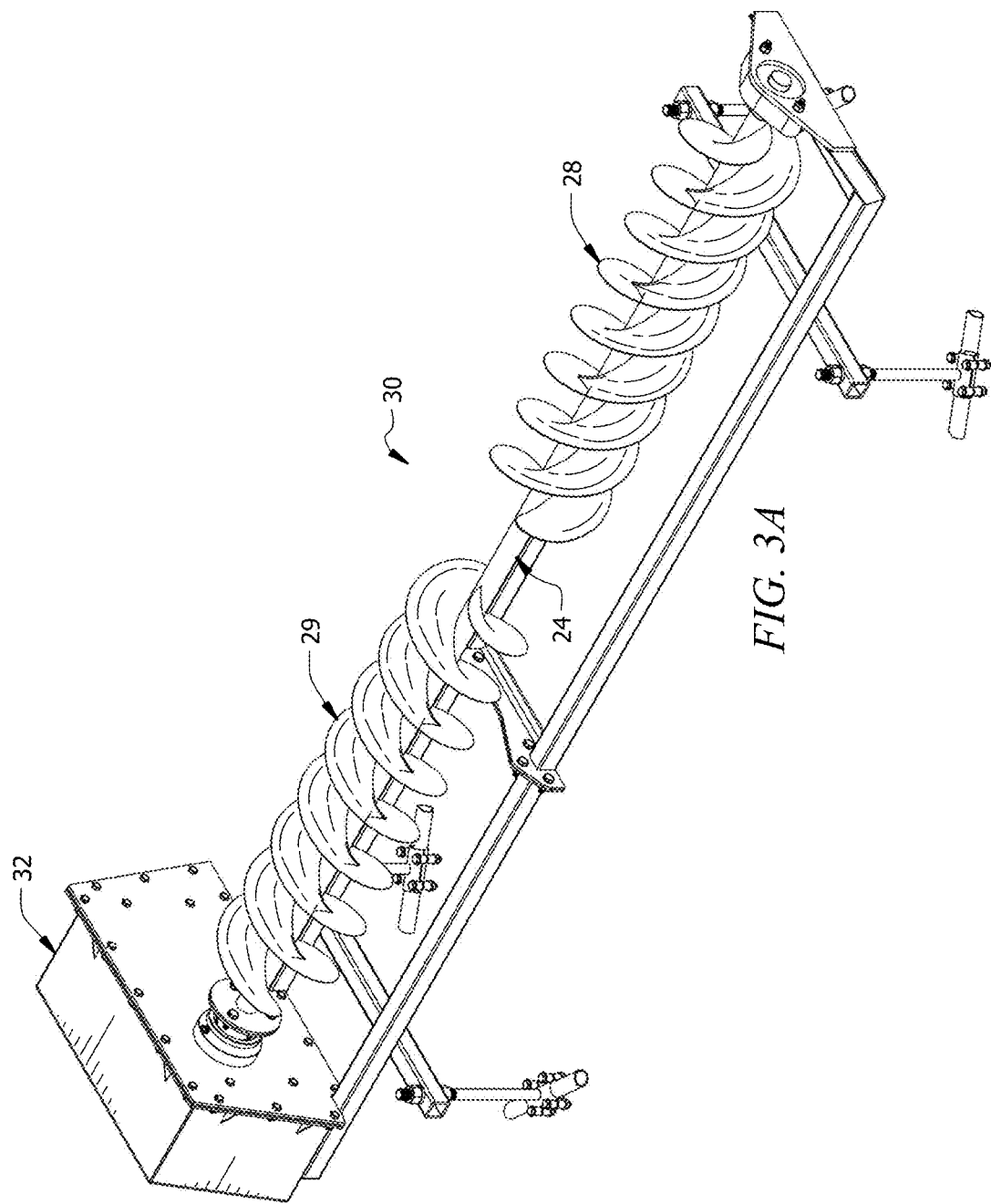
FIG. 3A illustrates an auger assembly, in accordance with certain embodiments.
Figure 3B:
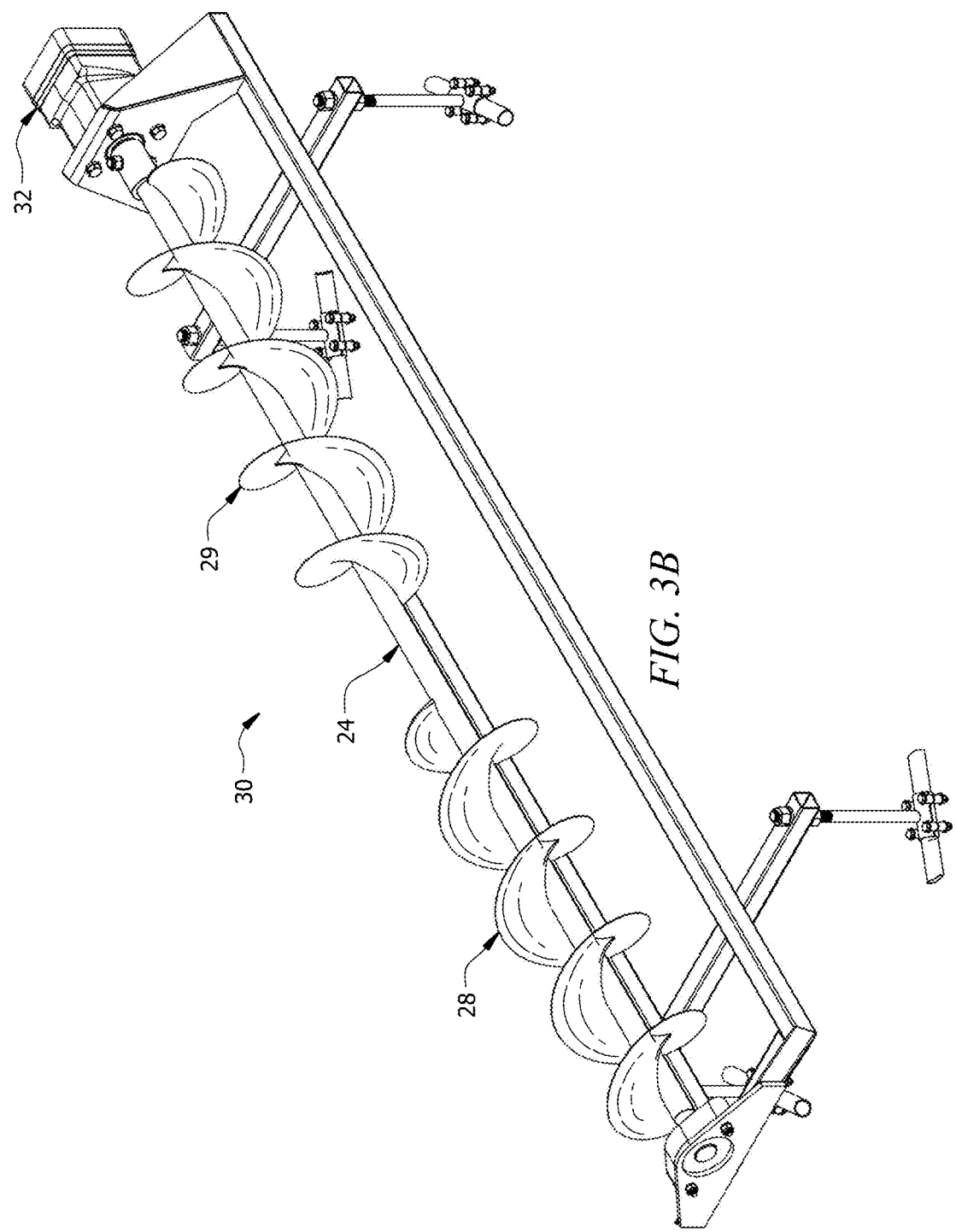
FIG. 3B illustrates an auger assembly, in accordance with certain embodiments.
Figure 4:
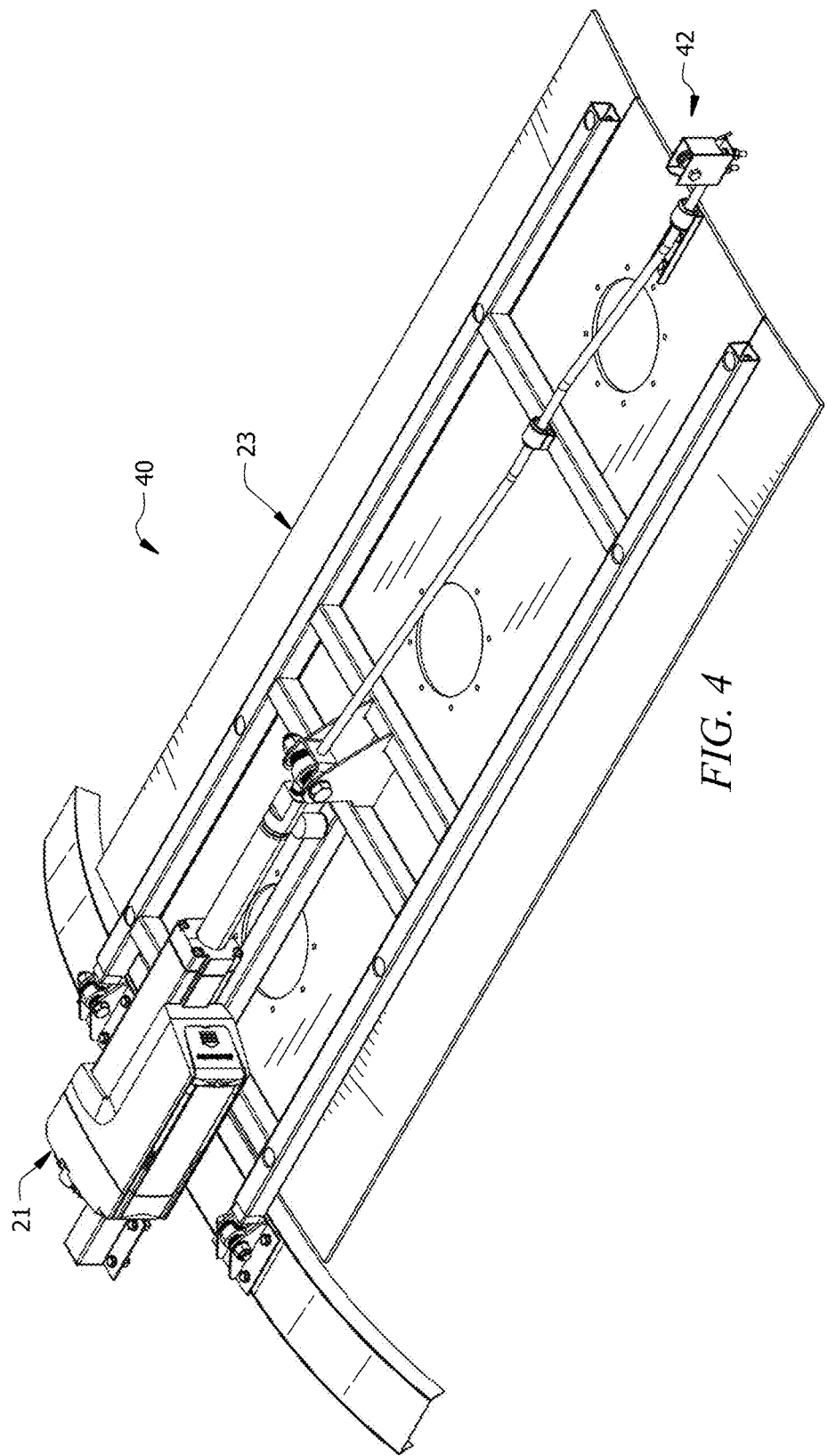
FIG. 4 illustrates a hopper cover assembly, in accordance with certain embodiments.
Figure 5:
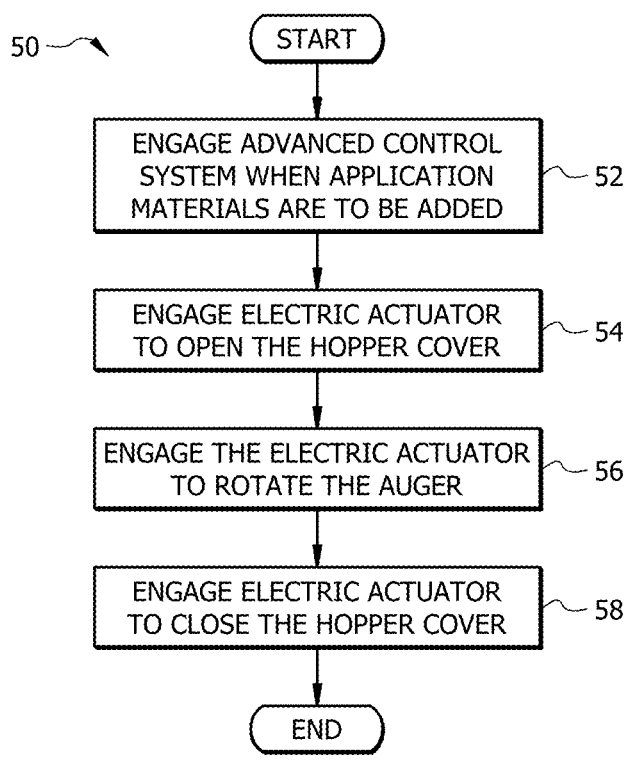
FIG. 5 illustrates a flowchart of a method for automating aspects of loading application materials in an aerial application aircraft, in accordance with certain embodiments.

FIG. 2 illustrates a hopper system 20 that includes a hopper cover assembly and an auger assembly. In certain embodiments, hopper system 20 may be positioned within hopper 12. In the illustrated embodiment, hopper system 20 includes a hopper cover 23 that is coupled to an actuator 21 and an auger 24 that is coupled to an actuator 22. It is understood that coupled, as used herein and throughout, may refer to any suitable technique for coupling, including through the use of mechanical linkages, connecting rods, or the like.

Hopper cover 23 represents any suitable component that attaches to hopper 12 and keeps application materials within hopper 12. Hopper cover 23 may be made of any suitable material, including by way of example stainless steel, steel, aluminum, composite materials, carbon composites, plastics, titanium, nickel, other metals, or the like. In the illustrated embodiment, hopper cover 23 includes a latch sequencing mechanism 25. Latch sequencing mechanism 25 represents any suitable components that causes hopper cover 23 to close and to keep application materials within hopper 12. Latch sequencing mechanism 25 may include other components that better secure hopper cover 23 to hopper 12. Latch sequencing mechanism 25 couples to and engages with dual latch mechanism 26 in the illustrated embodiment. Dual latch mechanism 26 represents any suitable component that allows for hopper cover 23 to latch in two places, which further facilitates keeping the application materials within hopper 12. In the illustrated embodiment, dual latch mechanism 26 engages a first and second latch box 27. Dual latch mechanism 26 may include other components to engage first and second latch box 27 to better secure hopper cover 23 to hopper 12. Dual latch mechanism 26 will be described in further detail in FIGS. 8, 9B, and 9C.

Actuator 21 within hopper system 20 couples to latch mechanism 25 and allows for latch sequencing mechanism 25 to engage or disengage depending on whether hopper cover 23 is intended to be open or close. Actuator 21 may be electrically actuated or any suitable technique for actuation may be used.

Auger 24 represents any suitable component that moves to allow application materials to disperse within hopper 12 and to release application materials outside of hopper 12 when needed. Auger 24 may include blades that facilitate the dispersion of applications materials. In the illustrated embodiment, auger 24 includes a first set of auger blades 28 and a second set of auger blades 29. The first set of auger blades 28 and the second set of auger blades 29 are positioned on auger 24 to allow for application materials 74 to be loaded to hopper 12 with minimal interference and to evenly distribute application materials 74 throughout the hopper 12. In other embodiments, first set of auger blades 28 and/or second set of auger blades 29 may be positioned in a different orientation to allow for application materials 74 to disperse. Auger 24 may also include a single set of auger blades to disperse application materials 74. Additionally, first set of auger blades 28 and second set of auger blades 29 may rotate in a clockwise and/or counterclockwise direction. First set of auger blades 28 and second set of auger blades 29 may rotate in the same direction or in different directions at the same time. First set of auger blades 28 and second set of auger blades 29 may be made of any suitable material, including stainless steel, steel, aluminum, composite materials, carbon composites, plastics, titanium, nickel, other metals, or the like.

Actuator 22 couples to auger 24 and allows for auger 24 to rotate or stop rotating depending on whether application materials should be dispersed. Actuator 22 may be hydraulically or electrically actuated, though it is understood that any suitable technique for actuation may be used. In the illustrated embodiment, actuator 22 is coupled to and/or engages auger 24 mounted within hopper 12 and capable of rotating auger 24.

In the illustrated embodiment, hopper system 20 is communicatively coupled to advanced control system 60, which will be described in greater detail in FIGS. 6 and 12. Advanced control system 60 controls the operation of hopper cover 23 and auger 24. For example, advanced control system 60 allows for hopper cover 23 to open and/or close. As another example, advanced control system 60 allows auger 24 to rotate as described above. It is understood that communicatively coupled, as used herein and throughout, may refer to any suitable means of electrical communication, including but not limited to a wired or wireless communication link or bus, or the like. Furthermore, hopper system 20, including hopper cover 23 and auger 24, may be automated, controlled, and/or actuated by advanced control system 60 from cockpit 14 of aerial application aircraft 10.

FIGS. 3A and 3B illustrate an auger assembly 30. In the illustrated embodiments, auger 24 is mounted within hopper 12 of aerial application aircraft 10. It is understood that "mounted within," as used herein and throughout, encompasses any suitable technique for mounting, affixing, or coupling. In the illustrated embodiment, actuator 32 is coupled to an auger 24 mounted within hopper 12. In the embodiment illustrated in FIG. 3A, auger 24 is coupled to electric actuator 32, and in the embodiment illustrated in FIG. 3B, auger 24 is coupled to hydraulic actuator 32. It is understood that any suitable technique of actuation may be used for actuator 32. In the illustrated embodiments, auger 24 further includes a first set of auger blades 28 and a second set of auger blades 29 that are separated by a gap. The gap between the first set of auger blades 28 and the second set of auger blades 29 may be of any length or position on auger 24. Auger 24 may also include a single set of auger blades to disperse application materials 74. First set of auger blades 28 and second set of auger blades 29 may utilize a concave curvature, convex curvature, or no curvature, to spread application materials 74 throughout hopper 12. It is understood that embodiments of the present disclosure may include any suitable arrangement of auger blades that allow for dispersing applications materials 74 that are loaded into hopper 12 evenly throughout hopper 12. It is further understood that auger blades may be coupled, affixed, and/or attached to auger 24 using any suitable technique of coupling, affixing, or attaching.

In the illustrated embodiment, auger assembly 30 is communicatively coupled to advanced control system 60 (not shown), which will be described in greater detail in FIGS. 6 and 12. Advanced control system 60 controls the operation of auger 24. For example, advanced control system 60 allows auger 24 to rotate as described above. It is understood that communicatively coupled, as used herein and throughout, may refer to any suitable technique of electrical communication, including but not limited to a wired or wireless communication link or bus, or the like. Furthermore, auger assembly 30, including auger 24, may be automated, controlled, and/or actuated by advanced control system 60 from cockpit 14 of aerial application aircraft 10.

FIG. 4 illustrates a hopper cover assembly 40 that includes electric actuator 21 coupled to hopper cover 23. It is understood that any suitable technique for actuation may be used for actuator 21. In the illustrated embodiment, electric actuator 21 is further coupled, via a series of mechanical linkages, connecting rods, or the like, to a latch pin that engages latch box 42. It is understood that any suitable technique of coupling may be used. Hopper cover assembly 40 may include any suitable components to engage latch box 42.

In the illustrated embodiment, hopper cover assembly 40 is communicatively coupled to advanced control system 60 (not shown), which will be described in greater detail in FIGS. 6 and 12. Advanced control system 60 controls the operation of hopper cover 23. For example, advanced control system 60 allows for hopper cover 23 to open and/or close. Advanced control system 60 may open hopper cover 23 wide enough to allow hopper 12 to be replenished by any suitable technique of replenishing a hopper of an aerial application aircraft, such as, an auger truck, super sack, and/or dump hopper. It is understood that communicatively coupled, as used herein and throughout, may refer to any suitable means of electrical communication, including but not limited to a wired or wireless communication link or bus, or the like. Furthermore, hopper cover assembly 40, including hopper cover 23, may be automated, controlled, and/or actuated by advanced control system 60 from cockpit 14 of aerial application aircraft 10.

FIG. 5 illustrates a flowchart of a method for automating aspects of loading application materials in an aerial application aircraft, in accordance with certain embodiments. Flowchart 50 depicts an exemplary method for automating aspects related to hopper system 20 for replenishing an aerial application aircraft. At step 52, advanced control system 60 is engaged when application materials are to be added to hopper 12. Any suitable technique may be used to engage advanced control system 60. For example, a button may be pressed, a switch may be flipped, an interface may be pushed, or any other suitable method for causing advanced control system 60 to communicate instructions for operation. Advanced control system 60 communicates with actuator 21 once engaged. At step 54, advanced control system 60 engages actuator 21 coupled to hopper cover 23 to open hopper cover 23. When hopper cover 23 is open, hopper 12 may receive application materials from a variety of sources, including, but not limited to, an auger truck, a super sack, or dump hopper. While hopper cover 23 is open, advanced control system 60 engages actuator 22 at step 56 to cause auger 24 to rotate. As discussed above, any suitable technique may be used to engage advanced control system 60. In certain embodiments, advanced control system 60 may cause first set of auger blades 28 and second set of auger blades 29 to rotate in a bi-directional manner to evenly disperse application materials throughout hopper 12. Once the application materials have been loaded into hopper 12, advanced control system 60 engages actuator 21 at step 58 to close hopper cover 23. Once hopper cover 23 closes, the method ends. Although this disclosure describes and illustrates particular steps flowchart 50 of FIG. 5 as occurring in a particular order, this disclosure contemplates any suitable steps of flowchart 50 occurring in any suitable order or simultaneously. Although this disclosure describes and illustrates an example method for automating aspects of loading application materials in an aerial application aircraft including the particular steps of the method of FIG. 5, this disclosure contemplates any suitable method for automating aspects of loading application materials in an aerial application aircraft including any suitable steps, which may include all, some, or none of the steps of the method of FIG. 5, where appropriate. Furthermore, although FIG. 5 describes and illustrates particular components, devices, or systems carrying out particular actions, this disclosure contemplates any suitable combination of any suitable components, devices, or systems carrying out any suitable actions.

Figure 6:
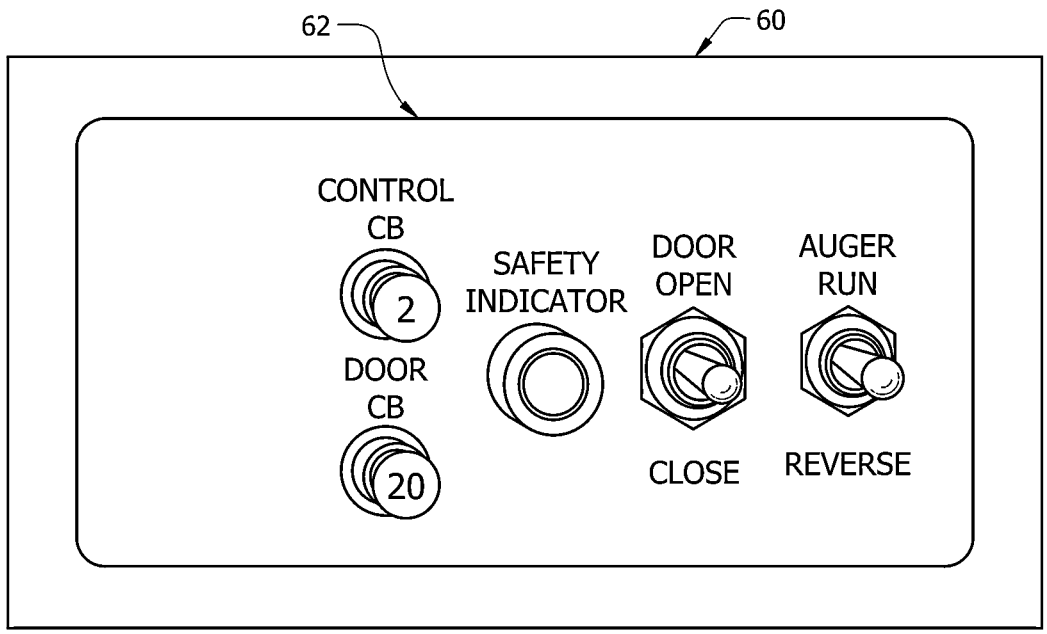
FIG. 6 illustrates an advanced control system, in accordance with certain embodiments.

FIG. 6 illustrates advanced control system 60 that includes safety indicator 62. Safety indicator 62 of advanced control system 60 is communicatively coupled to sensors (not shown) of aerial application aircraft 10, including hopper system 20. Advanced control system 60, including safety indicator 62, may monitor and/or measure outputs of sensors that measure or detect temperature, moisture, and/or electrical current. It is understood that advanced control system 60 may monitor and/or measure any suitable sensors that monitors information related to the safety of aerial application aircraft 10 or hopper system 20, including auger assembly 30 and hopper cover assembly 40. Advanced control system 60 may set one or more predefined thresholds for the measurements and/or readings of the one or more communicatively coupled sensors. Advanced control system 60 may indicate, such as by activating safety indicator 62, if one or more of the measurements and/or readings of the one or more communicatively coupled sensors exceeds or violates one or more predefined threshold(s). Such predefined thresholds include, for example, a predefined temperature threshold within hopper 12 (e.g., depending on the particular application materials being used, a typical temperature threshold may be anything above 75 degrees Celsius degrees Fahrenheit), a predefined moisture level threshold within the electrical components of hopper system 20 (e.g., detecting the presence of water in actuator 21 or actuator 22), and/or an electrical surge in/to electric actuator 21 and/or 22 (e.g., a flow of electrical current exceeding 70 amps or a flow of electrical current and/or voltage that exceeds the current and/or voltage limits provided by the manufacturer of the particular actuator). It is understood that advanced control system 60 and safety indicator 62 may set any suitable predefined threshold measurement and/or reading for any suitable communicatively coupled sensor.

Advanced control system 60 may automatically engage (as described above) one or more components of aerial application aircraft 10 and hopper system 20, including auger assembly 30 and hopper cover assembly 20, in response to detecting one or more of the measurements and/or readings of the one or more communicatively coupled sensors exceeds or violates one or more predefined threshold(s), as described above. For example, upon detection that any measurement and/or reading of the one or more communicatively coupled sensors exceeds or violates one or more predefined threshold(s), advanced control system 60 may engage safety indicator 62 to alert the pilot of aerial application aircraft 10. As another example, advanced control system 60 may mitigate and/or eliminate the flow of electrical current to actuator 21 and/or actuator 22 upon detecting an electrical surge. As another example, upon detecting a temperature that exceeds a predefined threshold, advanced control system 60 may engage hopper system 20 and/or related systems (e.g., the dump gate fed by hopper system 20) to jettison the application materials. Although this disclosure describes examples of how advanced control system 60 may automatically engage one or more systems of aerial application aircraft 10 and hopper system 20 in response to detecting one or more of the measurements and/or readings of the one or more communicatively coupled sensors exceeds or violates one or more predefined threshold(s), this disclosure contemplates engaging any suitable component in any suitable way to address any safety concern implicated by predefined threshold(s) that may be exceeded or violated.

Advanced control system 60 is communicatively coupled to hopper system 20 to control, automate, direct, control, and/or actuate the components of hopper system 20, including auger assembly 30 and its components and hopper cover assembly 40 and its components. Advanced control system 60 controls the operation of hopper cover 23 and auger 24. For example, advanced control system 60 allows for hopper cover 23 to open and/or close. As another example, advanced control system 60 allows auger 24 to rotate as described above. Hopper system 20, including hopper cover 23 and auger 24, may also be automated, controlled, and/or actuated by advanced control system 60 from cockpit 14 of aerial application aircraft 10. For example, advanced control system 60 may engage actuator 21 and cause hopper cover 23 to open and automatically engage actuator 22 to engage auger 24 to rotate. As another example, advanced control system 60 may engage actuator 21 and cause hopper cover 23 to close and automatically disengage actuator 22 and prevent auger 24 from rotating. As another example, when aerial application aircraft 10 is in flight, taking-off, landing, or taxiing, advanced control system 60 may engage disengage actuator 22 and prevent auger 24 from rotating. Although this disclosure describes how advanced control system 60 may automatically engage one or more assemblies or components of hopper system 20 in the examples discussed above, this disclosure contemplates advanced control system 60 engaging one or more assemblies or components of hopper system 20 in any order and using any suitable technique.

Figure 7:
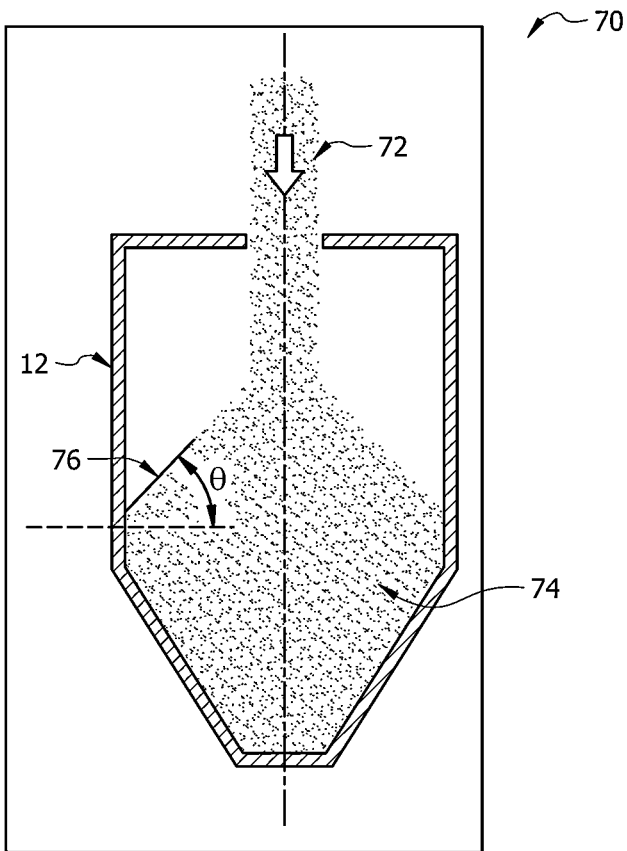
FIG. 7 illustrates a mound of application materials being poured or loaded into a hopper.
Figure 8:
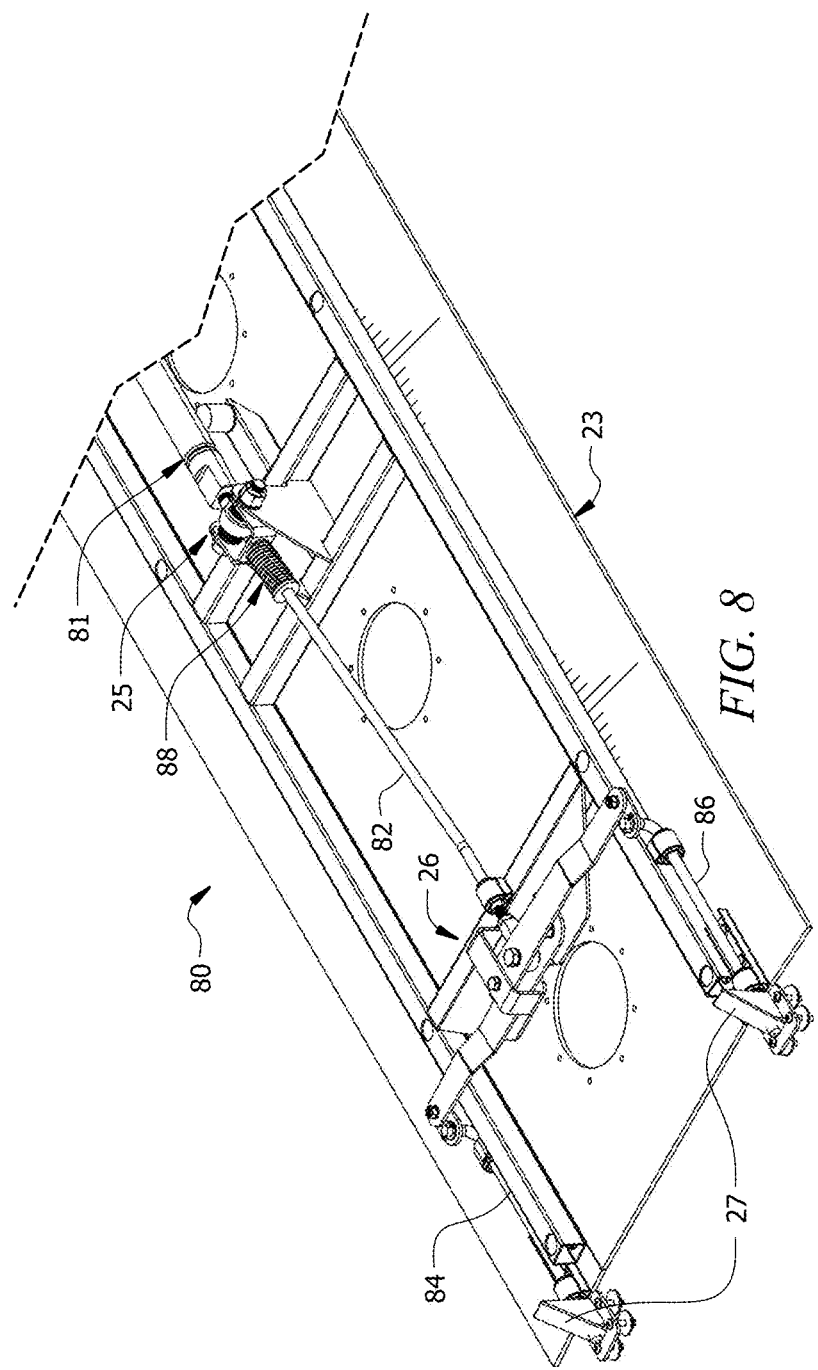
FIG. 8 illustrates a hopper cover assembly, in accordance with certain embodiments.
Figure 9A:
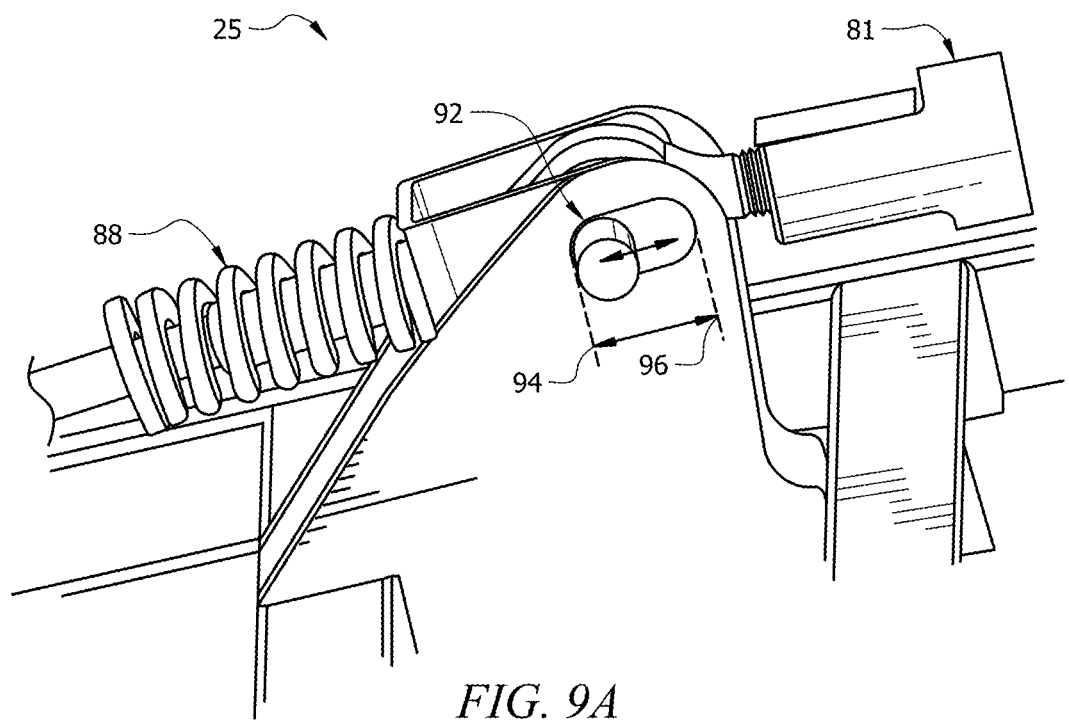
FIG. 9A illustrates a latch sequencing mechanism, in accordance with certain embodiments.
Figure 9B:
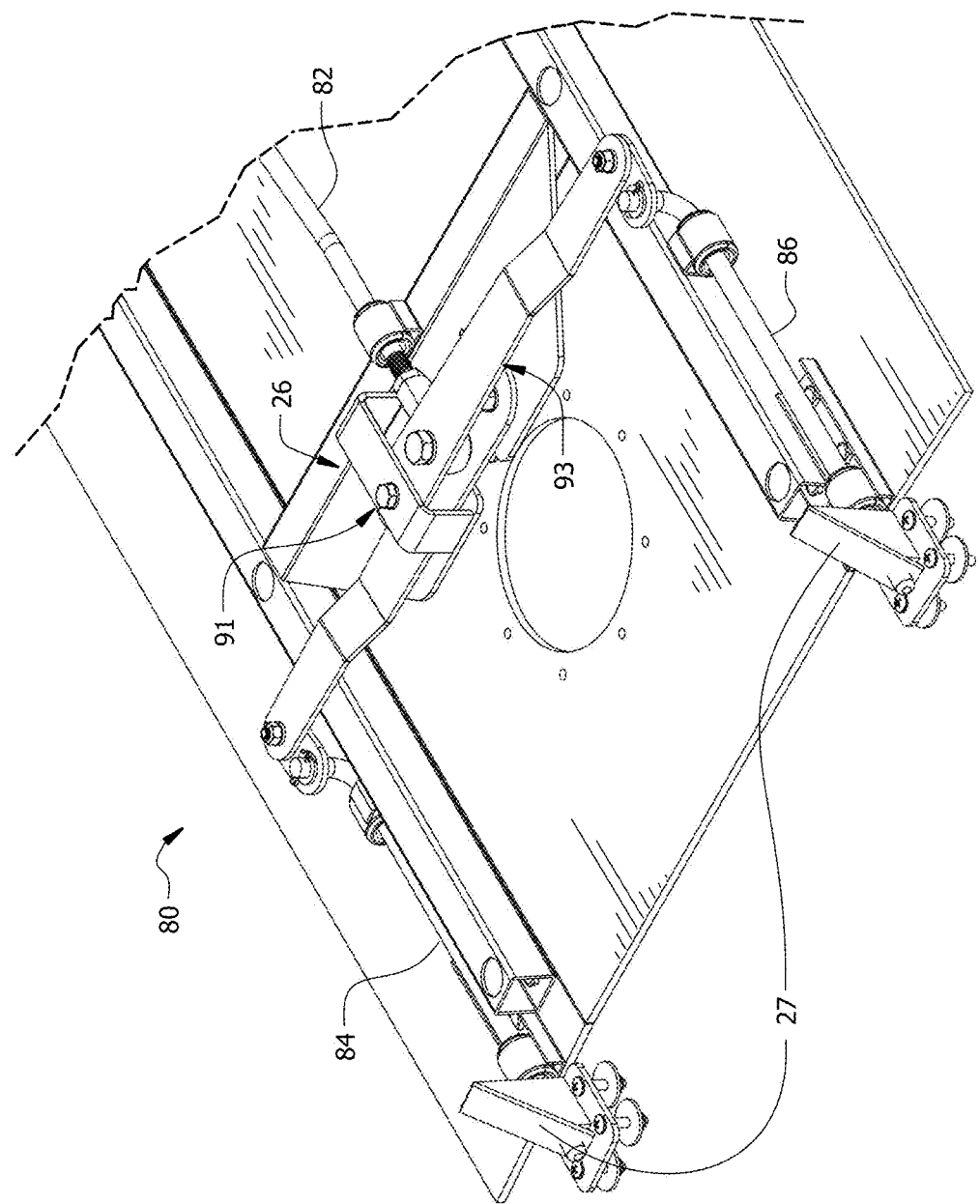
FIG. 9B illustrates a portion of a hopper cover assembly, in accordance with certain embodiments.
Figure 9C:
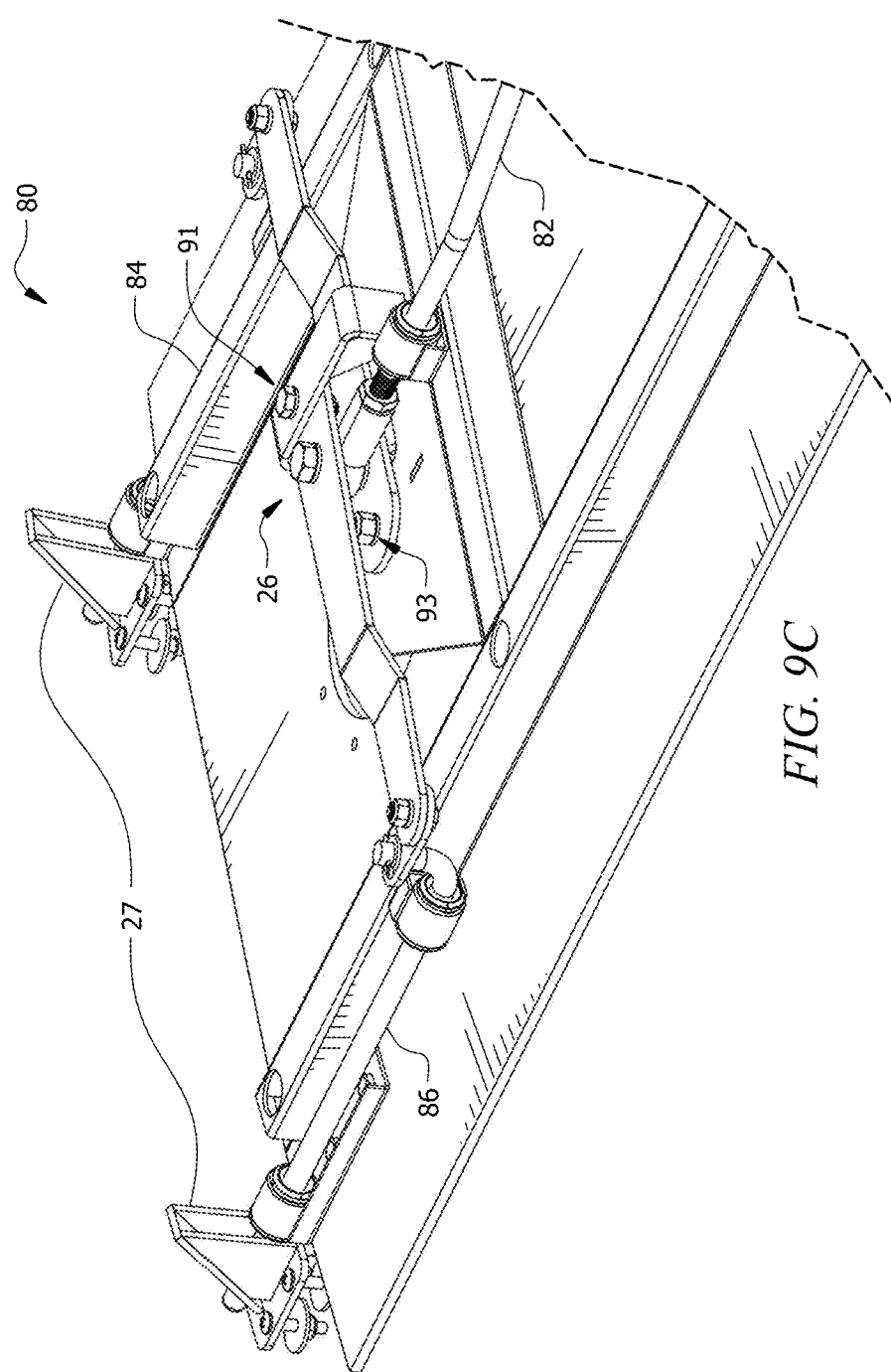
FIG. 9C illustrates a portion of a hopper cover assembly, in accordance with certain embodiments.

FIG. 7 illustrates a flow of application materials 72 being poured or loaded into hopper 12, forming a mound of application materials 70 with incline 76. Application materials 74 may include any suitable application materials, including dry granular material, dry powder material, dry seed, moistened sprouted seed, any combination of application materials, or the like. The flow of application materials 72 may come from any suitable source, including an auger truck, a super sack, dump hopper, or the like. The illustrated embodiment depicts the flow of application materials 72 in a roughly vertical orientation through an opening of hopper 12. It is understood that this flow of application materials 72 may be in any suitable direction for receiving application materials. In the illustrated embodiment, the flow of application materials 72 collects in hopper 12 and forms a mound of application materials 70. It is further understood that the flow of application materials 72 will affect the formation of mound of application materials 70 and incline 76 of the mound of application materials 70. As discussed above, aspects of the present disclosure mitigate and/or eliminate incline 76 of the mound of application materials 70 by dispersing application materials 74 evenly throughout hopper 12. For example, advanced control system 60 may engage actuator 22 to rotate auger 24. As another example, auger 24 may include a first set of auger blades 28 to disperse the mound of application materials 70 to a portion of hopper 12 and a second set of auger blades to disperse the mound of application materials 70 to another portion of hopper 12. As another example, the auger may use auger blades with a concave curvature to disperse the application materials throughout hopper 12. Although specific examples are provided above, hopper system 20 may use any combination of these examples, along with any aspects of hopper system 20 described or illustrated in the present disclosure, to disperse application materials throughout hopper 12.

FIG. 8 illustrates hopper cover assembly 80 that includes electric linear actuator 81, though it is understood that any suitable technique for actuation may be used. In the illustrated embodiment, electric linear actuator 81 is coupled to latch sequencing mechanism 25. As discussed above, latch sequencing mechanism 25 represents any suitable components that causes hopper cover 23 to close and to keep application materials within hopper 12. In the illustrated embodiment, latch sequencing mechanism 25 is further coupled to spring 88. Spring 88 represents any component that provides mechanical force, including any compression devices, mechanical by-passes, or the like. In the illustrated embodiment, spring 88 is coupled to connecting rod 82. Spring 88 may apply mechanical force to connecting rod 82, including after electric linear actuator 81 is no longer actuating, which improves the seal of hopper cover 23 when closed, including during operation of aerial application aircraft 10, even when no electric or hydraulic actuation force is being applied. Thus, it is understood that spring 88 may adjust any slack in hopper cover assembly 40 and 80 to improve the seal of hopper cover 23 when closed and keep application materials 72 contained in hopper 12. In the illustrated embodiment, connecting rod 82 is coupled to dual latch mechanism 26. As stated above, dual latch mechanism 26 represents any suitable component that allows for hopper cover 23 to latch in two places, which further facilitates keeping the application materials within hopper 12. In the illustrated embodiment, dual latch mechanism 26 is further coupled to first latch pin 84 and second latch pin 86. As stated above, it is understood that coupled, as used herein and throughout, may refer to any suitable means of coupling, including through the use of mechanical linkages, connecting rods, or the like. In the illustrated embodiment, first latch pin 84 and second latch pin 86 engage a first and second latch box 27, respectively. First latch pin 84 and second latch pin 86 and first and second latch box 27 represent any suitable component(s) for latching hopper cover 23 and may be coupled using any suitable technique.

FIG. 9A illustrates latch sequencing mechanism 25 including electric linear actuator 81 coupled to latch rod 92. As discussed, latch sequencing mechanism 25 represents any suitable components that cause hopper cover 23 to close and actuator 81 may be actuated by any suitable technique for actuation. Advanced control system 60 may engage actuator 81 to engage latch sequencing mechanism 25 and/or to open hopper cover 23. In the illustrated embodiment, actuation of linear electric actuator 81 may move latch rod 92 from unlatched position 96 to latched position 94, or vice versa, and unlatched position 96 may correspond hopper cover 23 being open and latched position 94 may correspond to hopper cover 23 being closed. In the illustrated embodiment, it is understood that distance between unlatched position 96 and latched position 94 and the actuation speed of actuator 81 affect the time it takes for advanced control system 60 to open hopper cover 23 from a closed position or close hopper cover 23 from an open position (sometimes referred to as dwell time). In the illustrated embodiment, the distance between unlatched position 96 and latched position 94 is minimized, which minimizes dwell time. Latch rod 92 and unlatched position 96 and latched position 94, however, represent any suitable components for opening or closing hopper cover 23, and may include any suitable arrangement of components for opening or closing hopper cover 23. In the illustrated embodiment, spring 88 is coupled to latch sequencing mechanism 25, including latch rod 92. As discussed above, spring 88 represents any component that provides mechanical force, including any compression devices, mechanical by-passes, or the like. In the illustrated embodiment, when advanced control system 60 engages electric linear actuator 81 and moves latch rod 92 to latched position 94, spring 88 may be compressed to exert linear mechanical force after electric linear actuator 81 is no longer actuating. As described above, in this way spring 88 acts as an automatic slack adjuster for any remaining actuation force still needed to close and/or seal hopper cover 23 after the electric actuator has been actuated.

FIGS. 9B and 9C illustrate a portion of a hopper cover assembly 80. In the illustrated embodiments, hopper cover assembly 80 includes connecting rod 82 coupled to dual latch mechanism 26. In the illustrated embodiment, advanced control system 60 engages electric linear actuator 81 to move latch rod 92 to latched position 94, spring 88 exerts force against connecting rod 82, and connecting rod 82 engages dual latch mechanism 26. As discussed, dual latch mechanism 26 represents any suitable component that allows for hopper cover 23 to latch in two places, which further facilitates keeping the application materials within hopper 12. Connecting rod 82 represents any suitable components and any suitable coupling technique for connecting dual latch mechanism 26 to hopper cover assembly 80.

In the illustrated embodiments, dual latch mechanism 26 includes a first pivot 91 and second pivot 93. In the illustrated embodiments, first pivot 91 is coupled to second latch pin 86 and second pivot 93 is coupled to first latch pin 84, and first latch pin 84 and second latch pin 86 engage first and second latch boxes 27. In the illustrated embodiments, connecting rod 82 linearly engages dual latch mechanism 26, causing first pivot 91 and second pivot 93 to move in a non-linear or circular direction or orientation, and first latch pin 84 and second latch pin 86 are actuated linearly engage a first and second latch box 27. In the illustrated embodiment, the couplings connecting dual latch mechanism 26 to connecting rod 82, first pivot 91, second pivot 93, first latch pin 84, and second latch pin 86, include mechanical linkages/couplings (i.e., washers, bolts, screws, any suitable components, or any combination of components) that do not bind when connecting a component that moves linearly with a component that moves non-linearly/rotationally. First pivot 91, second pivot 93, first latch pin 84, second latch pin 86, and first and second latch boxes 27 represent any suitable components and any suitable arrangement of components that allow dual latch mechanism to latch hopper cover 23 in two places, which further facilitates keeping the application materials within hopper 12, including during operation of aerial application aircraft 10 containing mound of application materials 70 in a variety of operating environments. In the illustrated embodiments, first latch pin 84 and second latch pin 86 include bushings, which facilitate the actuation of the latch pins to engage first and second latch boxes 27. Bushings represent any suitable component that facilitates latch pins 84 and 86 to engage the latch boxes 27, including supports, stabilizers, or the like. In the illustrated embodiments, first and second latch boxes 27 are inclined towards the hopper cover assembly 80, which further facilitates closing hopper cover 23 to keep application materials 74 within hopper 12. Latch boxes 27 represent any suitable component that allows for hopper cover 23 to latch in two places, which facilitates retention of application materials within hopper 12.

Figure 10:
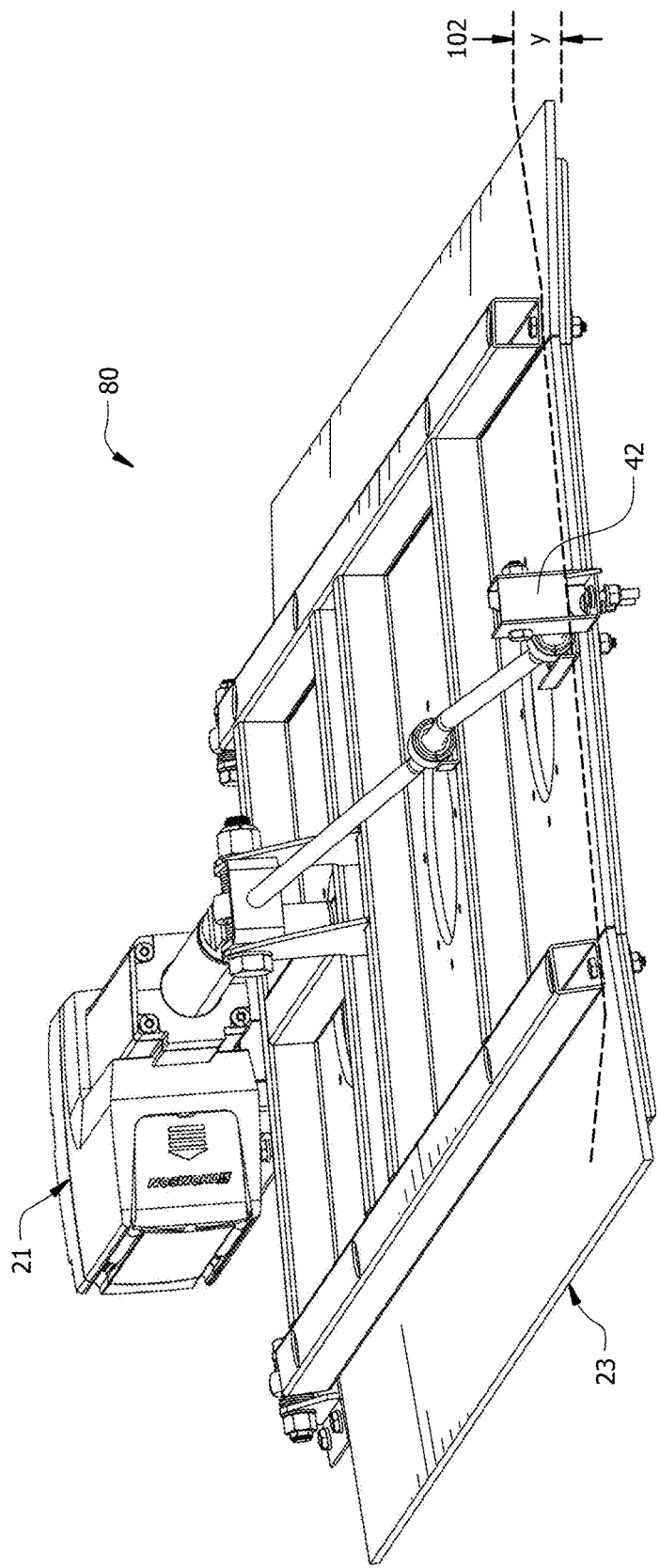
FIG. 10 illustrates deflection in a hopper cover assembly that utilize a single latch pin and single latch box.

FIG. 10 illustrates hopper cover assembly 80 that includes actuator 21 that may actuate and engage latch box 42 to close hopper cover 23. In the illustrated embodiment, the distance between hopper cover 23 when sealed or fully closed and a deflected position 102 of hopper cover 23 is represented by "y." The illustrated embodiment depicts how the distance of deflection "y" of hopper cover 23 may increase as the distance from latch box 42 increases. The amount of deflection "y" of hopper cover 23 may be caused by one or more of a plurality of factors, including for example, changes in temperature, wear and tear typical of aerial application aircrafts, type of application materials in hopper 12, foreign objects impeding hopper cover 23, defects in other components coupled to hopper cover 23, or other similar factors. It is understood that aspects of the present disclosure may mitigate the deflection of hopper cover 23. For example, in embodiments of the present disclosure, advanced control system 60 engages hopper cover assembly 80 to latch hopper cover 23 in two places, which reduces deflection and facilitates keeping the application materials within hopper 12. As another example, in embodiments of the present disclosure, first and second latch box 27 that are inclined in the direction of the hopper cover assembly 80, which applies additional closing force and may reduce deflection. As another example, in embodiments of the present disclosure, spring 88 applies mechanical force, even after actuator 81 is no longer actuating, which applies additional and/or constant closing force and may reduce deflection. Although non-limiting examples are provided above, it is understood that other aspects of the present disclosure may also reduce deflection in hopper cover 23, which facilitates keeping application materials 74 in hopper 12.

Figure 11:
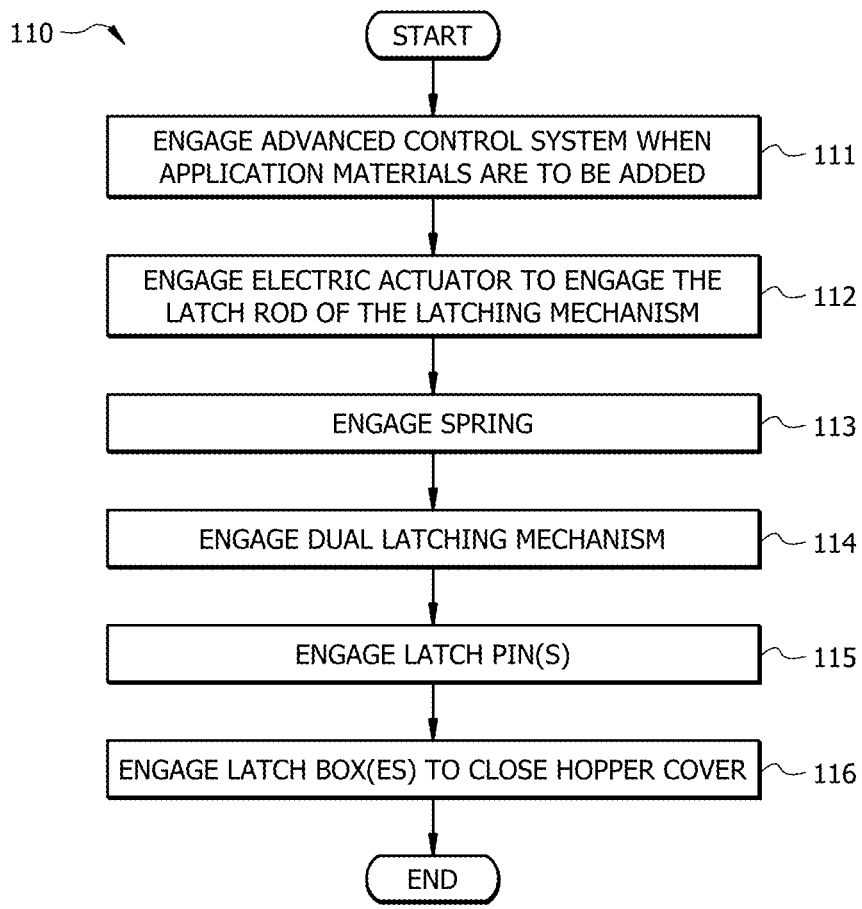
FIG. 11 illustrates a flowchart of a method for automating aspects of latching a hopper cover in an aerial application aircraft, in accordance with certain embodiments.

FIG. 11 illustrates a flowchart of a method for automating aspects of latching a hopper cover in an aerial application aircraft. Flowchart 110 depicts an exemplary method for automating aspects related to hopper cover assembly 80 for latching hopper cover 23 of aerial application aircraft 10. At step 111, advanced control system 60 is engaged when application materials are to be added. Any suitable technique may be used to engage advanced control system 60. For example, a button may be pressed, a switch may be flipped, and interface may be pushed, or any other suitable method for causing advanced control system 60 to communicate instructions for operation (as discussed in greater detail related to FIG. 12 above). At step 112, once application materials have been loaded into hopper 12, advanced control system 60 engages actuator 81 that actuates latch rod 92 of latch sequencing mechanism 25, moving latch rod 92 from unlatched position 96 to latched position 94. As discussed above regarding FIG. 9A, latch rod 92, latched position 94, and unlatched position 96 represent any suitable components and/or arrangement of components for opening or closing hopper cover 23. At step 113, engage spring 88, which exerts mechanical closing force to facilitate sealing hopper cover 23. As discussed, spring 88 represents any component that provides mechanical force, including any compression devices, mechanical by-passes, or the like. At step 114, engage dual latch mechanism 26. For example, the actuation of actuator 81, spring 88, or any suitable components may engage dual latch mechanism 26. At step 115, engage first latch pin 84 and second latch pin 86. For example, first latch pin 84 and second latch pin 86 may be engaged by dual latch mechanism 26 or any suitable components that allow hopper cover 23 to latch in two places. At step 116, engage first and second latch boxes 27, which facilitates sealing hopper cover 23 and keeping application materials 74 within hopper 12. For example, first and second latch boxes 27 may be engaged by first latch pin 84 and second latch pin 86 or any suitable components that allow hopper cover 23 to latch in two places. Once first and second latch boxes 27 are engaged, the method ends. Although this disclosure describes and illustrates particular steps flowchart 110 of FIG. 11 as occurring in a particular order, this disclosure contemplates any suitable steps of flowchart 110 occurring in any suitable order or simultaneously. Although this disclosure describes and illustrates an example method for automating aspects of latching a hopper cover in an aerial application aircraft including the particular steps of the method of FIG. 11, this disclosure contemplates any suitable method for automating aspects of latching a hopper cover in an aerial application aircraft including any suitable steps, which may include all, some, or none of the steps of the method of FIG. 11, where appropriate. Furthermore, although FIG. 11 describes and illustrates particular components, devices, or systems carrying out particular actions, this disclosure contemplates any suitable combination of any suitable components, devices, or systems carrying out any suitable actions.

Figure 12:
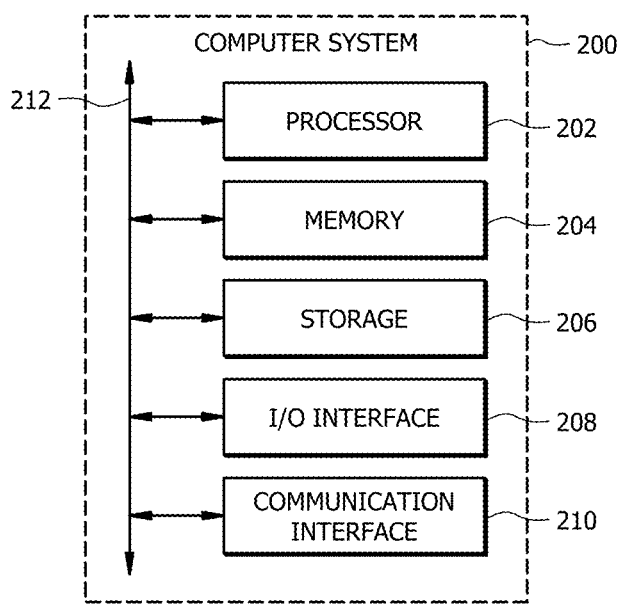
FIG. 12 illustrates a computer system that may be used by the systems and methods described herein, in accordance with certain embodiments.

FIG. 12 illustrates an example computer system 200. In particular embodiments, one or more computer systems 200 perform one or more steps of one or more methods described or illustrated herein. In particular embodiments, one or more computer systems 200 provide functionality described or illustrated herein. In particular embodiments, software running on one or more computer system 200 performs one or more steps of one or more methods described or illustrated herein or provides functionality described or illustrated herein. Particular embodiments include one or more portions of one or more computer system 200. Herein, reference to a computer system may encompass advanced control system 60, and vice versa, where appropriate. Moreover, reference to a computer system may encompass one or more computer systems, where appropriate.

This disclosure contemplates any suitable number of computer system 200. This disclosure contemplates computer system 200 taking any suitable physical form. As example and not by way of limitation, computer system 200 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 200 may include one or more computer system 200; be unitary or distributed; span multiple locations; span multiple machines; span multiple data centers; or reside in a cloud, which may include one or more cloud components in one or more networks. Where appropriate, one or more computer system 200 may perform without substantial spatial or temporal limitation one or more steps of one or more methods described or illustrated herein. As an example and not by way of limitation, one or more computer system 200 may perform in real time or in batch mode one or more steps of one or more methods described or illustrated herein. One or more computer system 200 may perform at different times or at different locations one or more steps of one or more methods described or illustrated herein, where appropriate.

In particular embodiments, computer system 200 includes a processor 202, memory 204, storage 206, an input/output (I/O) interface 208, a communication interface 210, and a bus 212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 202 includes hardware for executing instructions, such as those making up a computer program. As an example and not by way of limitation, to execute instructions, processor 202 may retrieve (or fetch) the instructions from an internal register, an internal cache, memory 204, or storage 206; decode and execute them; and then write one or more results to an internal register, an internal cache, memory 204, or storage 206. In particular embodiments, processor 202 may include one or more internal caches for data, instructions, or addresses. This disclosure contemplates processor 202 including any suitable number of any suitable internal caches, where appropriate. As an example and not by way of limitation, processor 202 may include one or more instruction caches, one or more data caches, and one or more translation lookaside buffers (TLBs). Instructions in the instruction caches may be copies of instructions in memory 204 or storage 206, and the instruction caches may speed up retrieval of those instructions by processor 202. Data in the data caches may be copies of data in memory 204 or storage 206 for instructions executing at processor 202 to operate on; the results of previous instructions executed at processor 202 for access by subsequent instructions executing at processor 202 or for writing to memory 204 or storage 206; or other suitable data. The data caches may speed up read or write operations by processor 202. The TLBs may speed up virtual-address translation for processor 202. In particular embodiments, processor 202 may include one or more internal registers for data, instructions, or addresses. This disclosure contemplates processor 202 including any suitable number of any suitable internal registers, where appropriate. Where appropriate, processor 202 may include one or more arithmetic logic units (ALUs); be a multi-core processor; or include one or more processors 202. Although this disclosure describes and illustrates a particular processor, this disclosure contemplates any suitable processor.

In particular embodiments, memory 204 includes main memory for storing instructions for processor 202 to execute or data for processor 202 to operate on. As an example and not by way of limitation, computer system 200 may load instructions from storage 206 or another source (such as, for example, another computer system 200) to memory 204. Processor 202 may then load the instructions from memory 204 to an internal register or internal cache. To execute the instructions, processor 202 may retrieve the instructions from the internal register or internal cache and decode them. During or after execution of the instructions, processor 202 may write one or more results (which may be intermediate or final results) to the internal register or internal cache. Processor 202 may then write one or more of those results to memory 204. In particular embodiments, processor 202 executes only instructions in one or more internal registers or internal caches or in memory 204 (as opposed to storage 206 or elsewhere) and operates only on data in one or more internal registers or internal caches or in memory 204 (as opposed to storage 206 or elsewhere). One or more memory buses (which may each include an address bus and a data bus) may couple processor 202 to memory 204. Bus 212 may include one or more memory buses, as described below. In particular embodiments, one or more memory management units (MMUs) reside between processor 202 and memory 204 and facilitate accesses to memory 204 requested by processor 202. In particular embodiments, memory 204 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 204 may include one or more memories 204, where appropriate. Although this disclosure describes and illustrates particular memory, this disclosure contemplates any suitable memory.

In particular embodiments, storage 206 includes mass storage for data or instructions. As an example and not by way of limitation, storage 206 may include a hard disk drive (HDD), a floppy disk drive, flash memory, an optical disc, a magneto-optical disc, magnetic tape, or a Universal Serial Bus (USB) drive or a combination of two or more of these. Storage 206 may include removable or non-removable (or fixed) media, where appropriate. Storage 206 may be internal or external to computer system 200, where appropriate. In particular embodiments, storage 206 is non-volatile, solid-state memory. In particular embodiments, storage 206 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 206 taking any suitable physical form. Storage 206 may include one or more storage control units facilitating communication between processor 202 and storage 206, where appropriate. Where appropriate, storage 206 may include one or more storages 206. Although this disclosure describes and illustrates particular storage, this disclosure contemplates any suitable storage.

In particular embodiments, I/O interface 208 includes hardware, software, or both, providing one or more interfaces for communication between computer system 200 and one or more I/O devices. Computer system 200 may include one or more of these I/O devices, where appropriate. One or more of these I/O devices may enable communication between a person and computer system 200. As an example and not by way of limitation, an I/O device may include a keyboard, keypad, microphone, monitor, mouse, printer, scanner, speaker, still camera, stylus, tablet, touch screen, trackball, video camera, switch, button, another suitable I/O device or a combination of two or more of these. An I/O device may include one or more sensors. This disclosure contemplates any suitable I/O devices and any suitable I/O interfaces 208 for them. Where appropriate, I/O interface 208 may include one or more device or software drivers enabling processor 202 to drive one or more of these I/O devices. I/O interface 208 may include one or more I/O interfaces 208, where appropriate. Although this disclosure describes and illustrates a particular I/O interface, this disclosure contemplates any suitable I/O interface.

In particular embodiments, communication interface 210 includes hardware, software, or both providing one or more interfaces for communication (such as, for example, packet-based communication) between computer system 200 and one or more other computer system 200 or one or more networks. As an example and not by way of limitation, communication interface 210 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 210 for it. As an example and not by way of limitation, computer system 200 may communicate with an ad hoc network, a personal area network (PAN), a LAN, a WAN, a MAN, or one or more portions of the Internet or a combination of two or more of these. One or more portions of one or more of these networks may be wired or wireless. As an example, computer system 200 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network, a 3G network, a 4G network, a 5G network, an LTE network, or other suitable wireless network or a combination of two or more of these. Computer system 200 may include any suitable communication interface 210 for any of these networks, where appropriate. Communication interface 210 may include one or more communication interfaces 210, where appropriate. Although this disclosure describes and illustrates a particular communication interface, this disclosure contemplates any suitable communication interface.

In particular embodiments, bus 212 includes hardware, software, or both coupling components of computer system 200 to each other. As an example and not by way of limitation, bus 212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, a CanBus, RS232 communication, or another suitable bus or a combination of two or more of these. Bus 212 may include one or more buses 212, where appropriate. Although this disclosure describes and illustrates a particular bus, this disclosure contemplates any suitable bus or interconnect.

The above embodiments and descriptions are given by way of example, and not limitation. Particular embodiments may include all, some, or none of the components, elements, features, functions, operations, or steps of the embodiments disclosed herein. One or more other technical advantages may be readily apparent to those skilled in the art from the figures, descriptions, and claims included herein. Embodiments according to the present disclosure are in particular disclosed in the attached claims directed to a system, wherein any feature mentioned in one claim category, e.g. system, can be claimed in another claim category, e.g. method, as well. Although the present invention has been described in several embodiments, given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A system for an aerial application aircraft, comprising:
    a hopper cover coupled to the aerial application aircraft;
    an electric actuator coupled to the hopper cover;
    a latch sequencing mechanism comprising a latch rod coupled to the electric actuator, wherein the electric actuator engages the latch sequencing mechanism and moves the latch rod between a latched position and an unlatched position;
    a spring coupled to the latch sequencing mechanism and the latch rod and operable to exert linear mechanical force based on the latch rod being in one of the latched position or the unlatched position;
    a dual latch mechanism coupled to the latch rod, wherein the dual latch mechanism comprises:
        a first latch pin that is operable to engage a first latch box; and
        a second latch pin that is operable to engage a second latch box opposite the first latch box.

2. The system of claim 1, wherein the first latch box and second latch box are positioned adjacent the hopper cover at an incline relative to the aerial application aircraft.

3. The system of claim 1, wherein the electric actuator is controlled by an advanced control system in a cockpit of the aerial application aircraft.

4. The system of claim 3, wherein the advanced control system is operable to automatically control a flow of electrical current to the electric actuator upon indication of an electrical surge.

5. The system of claim 1, wherein the spring is compressed when the latch rod is placed in the latched position.

6. The system of claim 1, wherein the hopper cover is open when the latch rod is in the unlatched position and the hopper cover is closed when the latch rod is in the latched position.

7. The system of claim 1, wherein the dual latch mechanism comprises a first pivot and a second pivot.

8. The system of claim 1, wherein the first latch pin engages the first latch box and the second latch pin engages the second latch box when the latch rod is placed in a latched position.

9. The system of claim 1, wherein the spring is not compressed when the latch rod is placed in the unlatched position.

10. The system of claim 1, wherein the dual latch mechanism further comprises a bushing coupled to one of the first latch pin and second latch pin.

11. A method for controlling a hopper cover of an aerial application aircraft, comprising:
    engaging an advanced control system to control the hopper cover of an aerial application aircraft;
    activating, using the advanced control system, an electric actuator coupled a latch sequencing mechanism to move a latch rod between a latched position and an unlatched position;
    engaging a spring coupled to the latch sequencing mechanism and the latch rod to exert linear mechanical force based on the latch rod being in one of the latched position or the unlatched position;
    engaging a dual latch mechanism coupled to the latch rod causing a first latch pin to engage a first latch box and a second latch pin to engage a second latch box opposite the first latch box.

12. The method of claim 11, wherein engaging an advanced control system to control the hopper further comprises engaging the advanced control system from a cockpit of the aerial application aircraft.

13. The method of claim 11, wherein engaging the dual latch mechanism coupled to the latch rod causing the first latch pin to engage the first latch box and the second latch pin to engage the second latch box opposite the first latch box, further comprises causing the first latch pin to engage the first latch box and the second latch pin to engage the second latch box opposite the first latch box simultaneously.

14. The method of claim 11, wherein engaging the spring coupled to the latch sequencing mechanism and the latch rod and exerting linear mechanical forced based on the latch rod being in one of the latched position or the unlatched position, further comprises compressing the spring when the latch rod is in the latched position.

15. The method of claim 11, wherein engaging the spring coupled to the latch sequencing mechanism and the latch rod and exerting linear mechanical force based on the latch rod being in one of the latched position or the unlatched position, further comprises decompressing the spring when the latch rod is in the unlatched position.

16. The method of claim 11, wherein engaging the dual latch mechanism, further comprises actuating a first pivot and a second pivot.

17. The method of claim 11, further comprising monitoring, using the advanced control system, a safety indicator.

18. The method of claim 17, further comprising setting, using the advanced control system, a predefined threshold for the safety indicator.

19. The method of claim 18, further comprising detecting, using the advanced control system, whether a measurement exceeds the predefined threshold, wherein the predefined threshold is an electrical surge threshold.

20. The method of claim 19, further comprising automatically controlling, using the advanced control system, a flow of electrical current upon detecting the electrical surge threshold has been exceeded.

* * * * *